United States Patent
Liu et al.

(10) Patent No.: US 8,902,538 B1
(45) Date of Patent: Dec. 2, 2014

(54) DISK DRIVE DETECTING CRACK IN MICROACTUATOR

(71) Applicant: Western Digital Technologies, Inc., Irvine, CA (US)

(72) Inventors: Yanning Liu, San Ramon, CA (US); Nathan J. Santee, Mission Viejo, CA (US); Yi Lu, San Jose, CA (US); Yanan Huang, Torrance, CA (US); Toviah N. Hirschberg, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 13/932,705

(22) Filed: Jul. 1, 2013

Related U.S. Application Data

(60) Provisional application No. 61/806,798, filed on Mar. 29, 2013.

(51) Int. Cl.
*G11B 5/596* (2006.01)
*G11B 21/02* (2006.01)
*G11B 27/36* (2006.01)
*G11B 5/455* (2006.01)

(52) U.S. Cl.
CPC ..................................... *G11B 5/455* (2013.01)
USPC .............................. 360/78.05; 360/75; 360/31

(58) Field of Classification Search
None
See application file for complete search history.

(56) References Cited

U.S. PATENT DOCUMENTS

| 4,736,353 | A | 4/1988 | Kasai et al. |
|---|---|---|---|
| 6,014,283 | A | 1/2000 | Codilian et al. |
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,094,973 | A | 8/2000 | Novotny |
| 6,101,065 | A | 8/2000 | Alfred et al. |
| 6,104,153 | A | 8/2000 | Codilian et al. |
| 6,122,133 | A | 9/2000 | Nazarian et al. |
| 6,122,135 | A | 9/2000 | Stich |
| 6,141,175 | A | 10/2000 | Nazarian et al. |
| 6,160,368 | A | 12/2000 | Plutowski |
| 6,181,502 | B1 | 1/2001 | Hussein et al. |
| 6,195,222 | B1 | 2/2001 | Heminger et al. |
| 6,198,584 | B1 | 3/2001 | Codilian et al. |
| 6,198,590 | B1 | 3/2001 | Codilian et al. |
| 6,204,988 | B1 | 3/2001 | Codilian et al. |
| 6,243,223 | B1 | 6/2001 | Elliott et al. |
| 6,281,652 | B1 | 8/2001 | Ryan et al. |
| 6,285,521 | B1 | 9/2001 | Hussein |
| 6,292,320 | B1 | 9/2001 | Mason et al. |
| 6,310,742 | B1 | 10/2001 | Nazarian et al. |
| 6,320,718 | B1 | 11/2001 | Bouwkamp et al. |
| 6,340,858 | B1 | 1/2002 | Jaenker |

(Continued)

*Primary Examiner* — Andrew L Sniezek

(57) ABSTRACT

A disk drive is disclosed comprising a disk media, a head stack assembly (HSA) having a head coupled to its distal end, a microactuator used to provide fine position of the head and a voice coil motor (VCM) configured to actuate the HSA over the disk media, and control circuitry. The control circuitry may be configured to move the HSA in an alternating manner across the disk media while actuating the microactuator. One or more performance characteristics of the microactuator may be measured before and after the actuation of the microactuator, and failure may be detected based on the absolute or relative change of the one or more performance characteristics.

24 Claims, 15 Drawing Sheets

(56) References Cited

U.S. PATENT DOCUMENTS

| | | | |
|---|---|---|---|
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,510,752 B1 | 1/2003 | Sacks et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,639,411 B1 | 10/2003 | Thomsen |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,721,124 B2 | 4/2004 | Chang et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,861,854 B1 | 3/2005 | Guo et al. |
| 6,867,944 B1 | 3/2005 | Ryan |
| 6,870,377 B2 * | 3/2005 | Thomsen ............... 324/727 |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,072,134 B1 | 7/2006 | Hirano et al. |
| 7,088,547 B1 | 8/2006 | Wang et al. |
| 7,095,579 B1 | 8/2006 | Ryan et al. |
| 7,106,552 B2 | 9/2006 | Hirano et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,124,654 B1 | 10/2006 | Davies et al. |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |

(56) References Cited

U.S. PATENT DOCUMENTS

| | | |
|---|---|---|
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,768,276 B2 | 8/2010 | Yao |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 2003/0117742 A1 | 6/2003 | Koso et al. |
| 2006/0109586 A1 | 5/2006 | White et al. |
| 2006/0171062 A1* | 8/2006 | Hirano et al. ............ 360/78.05 |
| 2007/0223136 A1 | 9/2007 | Hutsell |
| 2010/0035085 A1 | 2/2010 | Jung et al. |
| 2012/0281310 A1* | 11/2012 | Lim et al. .............. 360/77.02 |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

DISK DRIVE DETECTING CRACK IN MICROACTUATOR

CROSS REFERENCE TO RELATED APPLICATION(S)

This application claims priority to provisional U.S. Patent Application Ser. No. 61/806,798, filed on Mar. 29, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it moves from track to track.

FIG. 1 shows a prior art disk format 1 as comprising a number of servo tracks 3 defined by servo sectors $5_0$-$5_N$ recorded around the circumference of each servo track. Each servo sector $5_i$ comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track while the head is moving. Each servo sector $5_i$ further comprises groups of servo bursts 13, which are recorded with precise intervals and offsets relative to the track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed such as a suitable piezoelectric (PZT) actuator. It may be desirable to test the microactuators so that defective microactuators can be replaced or disabled.

DETAILED DESCRIPTION

Figure 1:
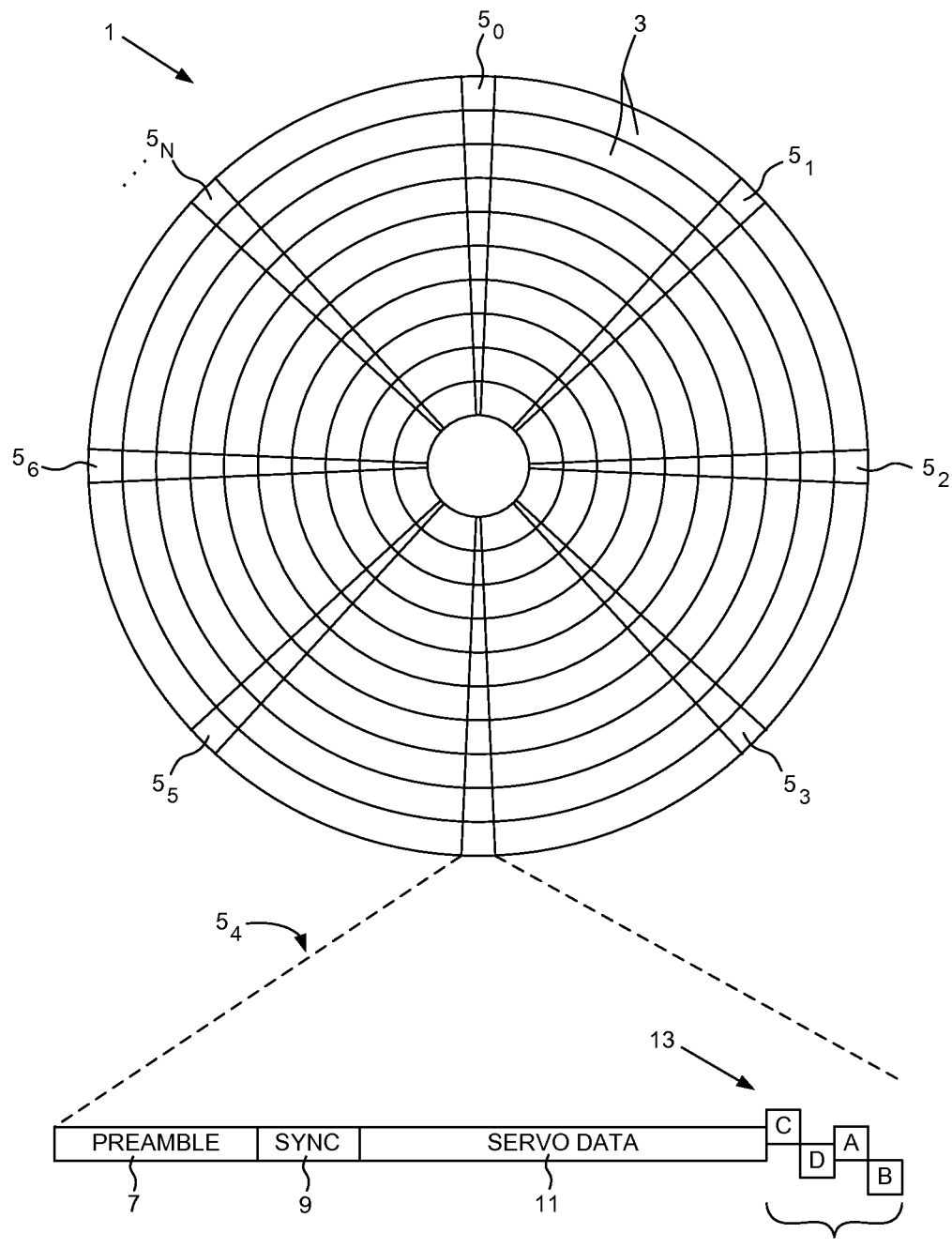
FIG. 1 shows a prior art disk format comprising a plurality of servo sectors that define a plurality of servo tracks.
Figure 3A:
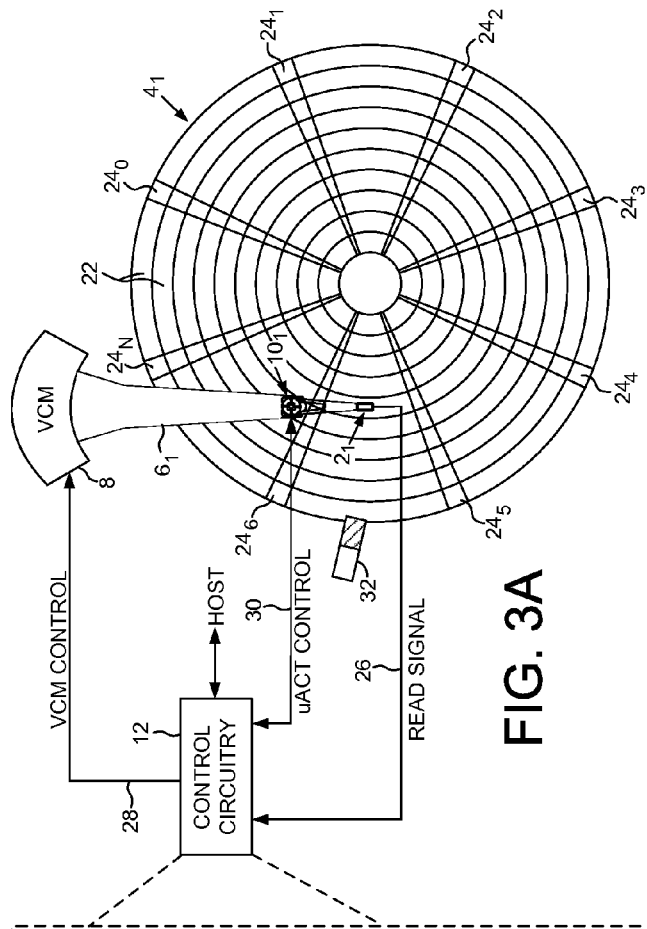
FIG. 3A shows a disk drive according to an example embodiment of the present inventive concept comprising a head actuated over a disk surface by a voice coil motor (VCM) and a microactuator.
Figure 2:
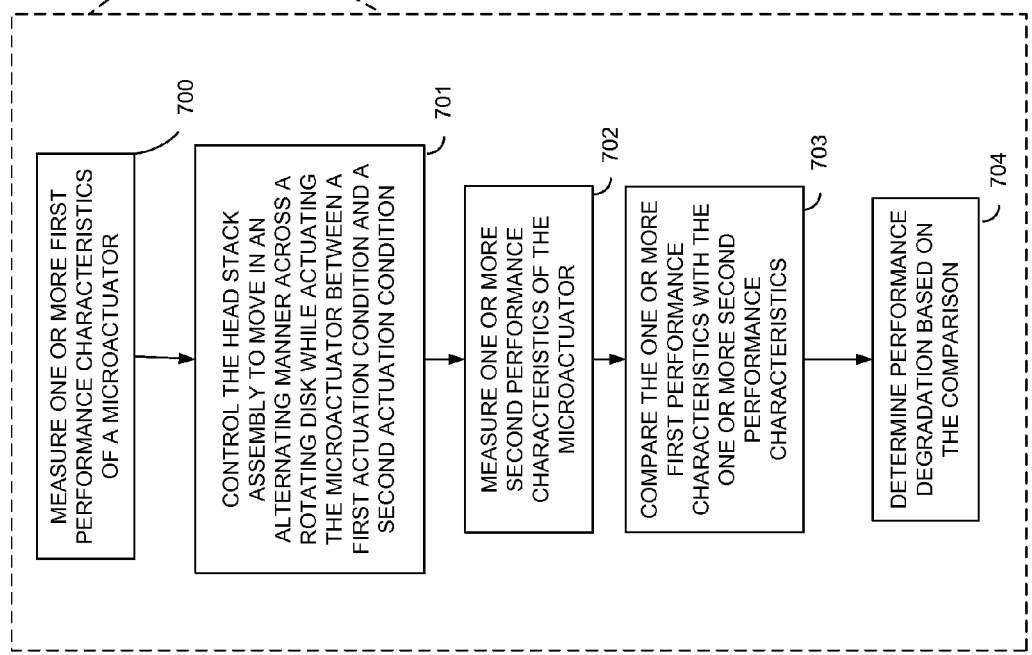
FIG. 2 is a flow diagram according to an example embodiment of the present inventive concept wherein a servo loop is disabled while exciting the microactuator to accentuate a crack in the microactuator.

FIG. 2 is a flow diagram according to an example embodiment of the present inventive concept wherein a servo loop is disabled while exciting the microactuator to accentuate a crack in the microactuator. In an embodiment, the flow diagram of FIG. 2 is executed by control circuitry of a disk drive, such as that shown in FIG. 3A. FIG. 3A shows a disk drive according to an example embodiment of the present inventive concept comprising a first disk surface $4_1$, a first head $2_1$ coupled to a distal end of an actuator arm $6_1$, and a voice coil motor (VCM) 8 and a first microactuator $10_1$ operable to actuate the first head $2_1$ over the first disk surface $4_1$. The disk drive further comprises control circuitry 12 for executing various processes illustrated in the flow diagrams in this disclosure. Further details of the flow diagrams that can be implemented by the control circuitry are described below.

The example flow diagram of FIG. 2 is implemented to measure first performance characteristics of a microactuator (700), control the head stack assembly to move in an alternating manner (701), measure second performance characteristics (702), compare the first performance characteristics to the second performance characteristics (703) and determine performance degradation (704). Additional details related to the flow will be described in conjunction with FIG. 7.

Terms such as "first", "second", "third", etc. are used for labeling purposes and are not meant to be limiting to any particular order. For example, in another example implementation by the control circuitry 12, the control circuitry can implement move the HSA in an alternating manner across the disk media, while actuating the microactuator, measure one or more first performance characteristics of the microactuator; and detect failure based on one or more first performance characteristics. In another example implementation by the control circuitry 12, the control circuitry measures one or more second performance characteristics of the microactuator before moving the HSA in an alternating manner across the disk media, and detects failure by comparing the one or more first performance characteristics to the one or more second performance characteristics to determine performance degradation of the microactuator.

In the example embodiment of FIG. 3A, each disk surface (e.g., disk surface $4_1$) comprises a plurality of tracks 22 defined by a plurality of servo sectors $24_1$-$24_n$. As the head $2_1$ passes over a servo sector, the control circuitry 12 demodulates the read signal 26 into a position error signal (PES). The PES is filtered by a suitable compensation filter to generate a control signal 28 applied to the VCM 8. The VCM 8 rotates an actuator arm $6_1$ about a pivot in order to position the head $2_1$ radially over the disk $4_1$ in a direction that reduces the PES. The control circuitry 12 may also generate a control signal 30 applied to the microactuator $10_1$ in response to the PES to further increase the bandwidth of the servo system.

Also, in the example embodiment of FIG. 3A, the disk drive comprises a ramp 32 located at an outer edge of the disk for unloading the actuator arm $6_1$ while the disk drive is idle. In an example embodiment described in greater detail below, the control circuitry 12 may evaluate the microactuator $10_1$ using the ramp 32, for example, by measuring a voltage induced by the microactuator $10_1$ when the load beam $34_1$ is deflected as the actuator arm $6_1$ strikes the ramp 32.

Figure 3B:
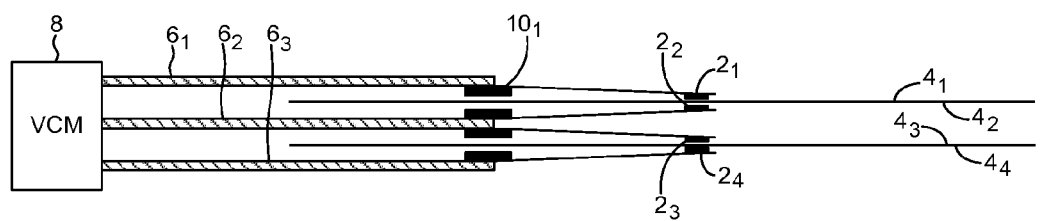
FIG. 3B shows an example embodiment of the present inventive concept wherein the disk drive comprises a plurality of disk surfaces and a plurality of heads actuated by the VCM and respective microactuators.

FIG. 3B shows an example embodiment of the present inventive concept wherein the VCM 8 rotates a plurality of actuator arms $6_1$-$6_n$ about a pivot in order to coarsely position a plurality of heads $2_1$-$2_n$ over respective disk surfaces $4_1$-$4_n$. A plurality of microactuators $10_1$-$10_n$ are also provided for fine positioning each head, wherein in one example embodiment disclosed below, the microactuators $10_1$-$10_n$ are simultaneously excited at the test frequency and then evaluated individually.

Figure 3C:
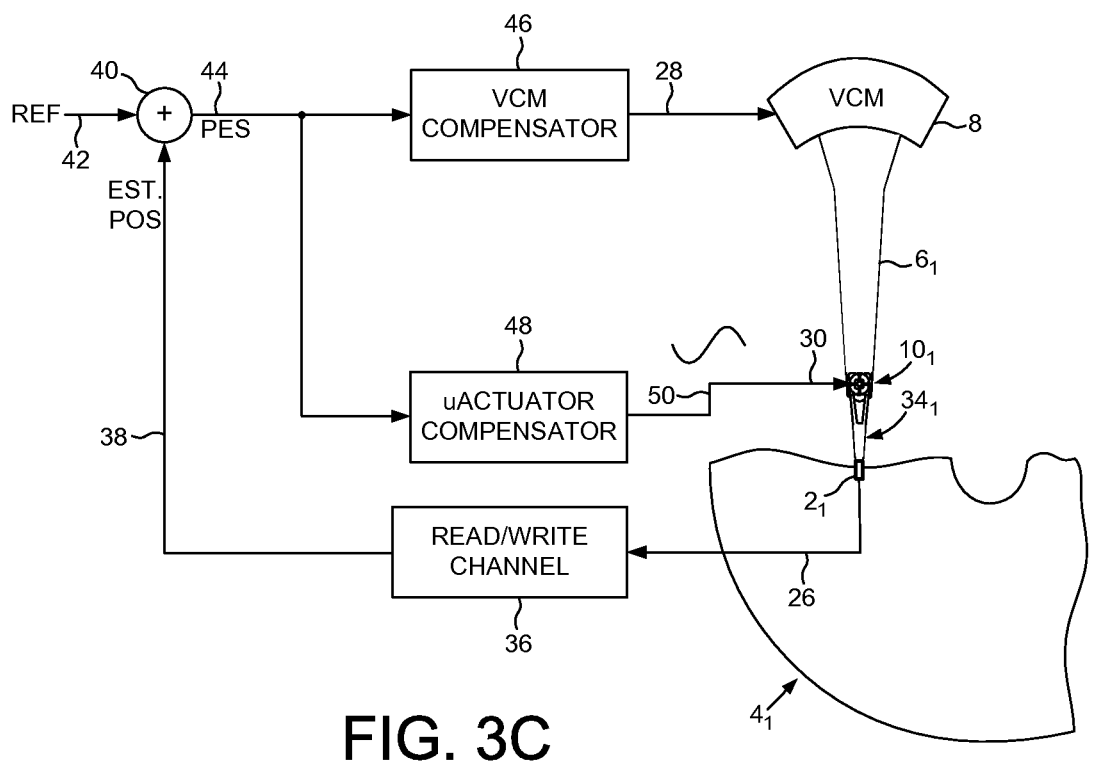
FIG. 3C shows control circuitry according to an example embodiment of the present inventive concept for servoing the head over the disk surface using the VCM and the microactuator.

FIG. 3C shows control circuitry according to an example embodiment of the present inventive concept for servoing the head $2_1$ over the disk surface $4_1$ using the VCM 8 and the microactuator $10_1$. During normal operation, a read/write channel 36 processes the read signal 26 to demodulate the servo sectors $24_1$-$24_n$ into an estimated position 38 of the head $2_1$ over the disk surface $4_1$. The estimated position 38 is subtracted 40 from a reference position 42 to generate the PES 44. The PES 44 is processed by a VCM compensator 46 to generate a control signal 28 applied to the VCM 8 and processed by a microactuator compensator 48 to generate a control signal 30 applied to the microactuator $10_1$.

In another example embodiment, as illustrated in the flow diagram of FIG. 8 and described in further detail below, the control circuitry may servo the head to an inner diameter of the disk and then press the actuator arm against an inner diameter crash stop prior to exciting the microactuator $10_1$. This example embodiment ensures that data recorded on the disk is not corrupted if the head contacts the disk surface while exciting the microactuator $10_1$.

Figure 4:
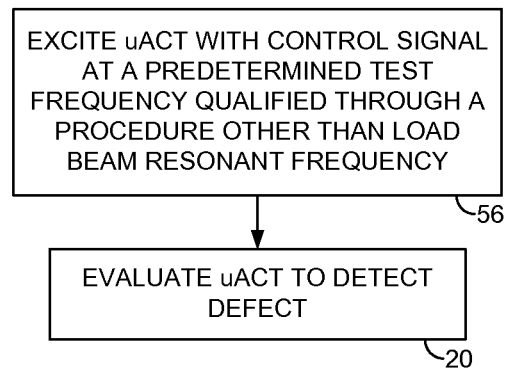
FIG. 4 is a flow diagram according to an example embodiment of the present inventive concept wherein the microactuator is excited with a test frequency other than a resonant frequency of a load beam.

Any suitable frequency may be selected as the test frequency to excite the microactuator. For example, the microactuator can be excited with a control signal at a predetermined test frequency qualified through a procedure other than the load beam resonant frequency. In an example embodiment shown in FIG. 4 the test frequency is substantially different from a resonant frequency of the load beam $34_1$ (block 56) so as not to damage the load beam $34_1$ or the interconnect of the load beam $34_1$ to the actuator arm $6_1$. In one example embodiment, an amplitude of the test frequency 50 is substantially higher than an amplitude of the control signal 30 applied during normal operation of the disk drive so as to minimize the time required to accentuate potential cracks in the microactuator $10_1$. Using a higher amplitude control signal to excite the microactuator $10_1$ may induce vibrations that may cause the head to contact the disk surface. However, pressing the actuator arm $6_1$ against the inner diameter crash stop ensures the head cannot corrupt user data recorded on the disk. In another example embodiment, the test frequency may excite the microactuator $10_1$ after unloading the actuator arm $6_1$ onto the ramp 32; however, in this example embodiment the vibrations of the load beam $34_1$ may result in undesirable wear of the ramp 32.

Figure 5A:
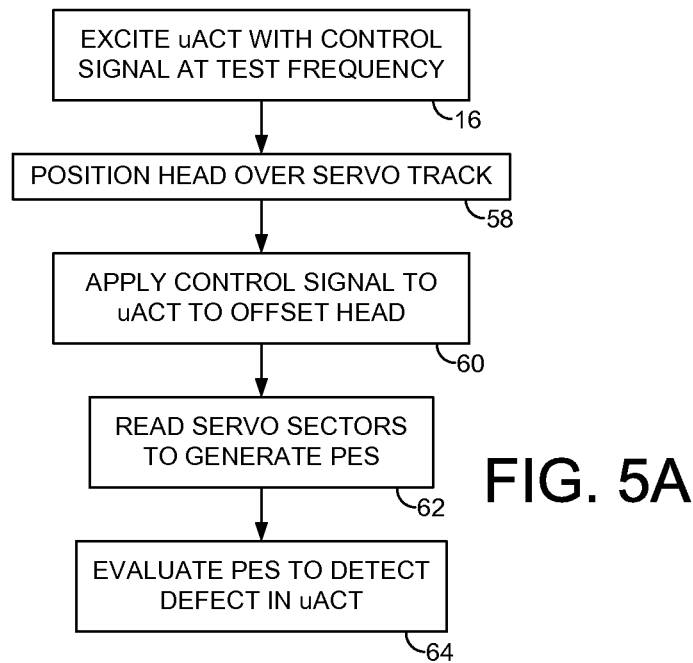
FIG. 5A is a flow diagram according to an example embodiment of the present inventive concept wherein after exciting the microactuator, the microactuator is evaluated in response to a position error signal (PES) generated while servoing the head in response to the servo sectors.

After exciting the microactuator $10_1$ at the predetermined test frequency, the microactuator $10_1$ evaluated to detect a crack or other defect in the microactuator $10_1$ (block 20). Any suitable technique may be employed to evaluate the microactuator $10_1$, wherein in one example embodiment shown in the flow diagram of FIG. 5A, after the microactuator is excited with a control signal at a test frequency (block 16), the head is positioned over a servo track (block 58) by reading the servo sectors, and then a control signal applied to the microactuator $10_1$ to offset the head (block 60). The servo sectors are read to generate a PES (block 62), and the PES evaluated to detect a crack or other defect in the microactuator (block 64). In an example embodiment, a sinusoidal control signal is applied to the microactuator $10_1$ in order to offset the head from the servo track to generate the PES, wherein any suitable frequency of the control signal may be employed. Other example embodiments described in greater detail below may evaluate the microactuator $10_1$ by selecting the output of the microactuator compensator 48 as the control signal 30 applied to the microactuator $10_1$.

Figure 5B:
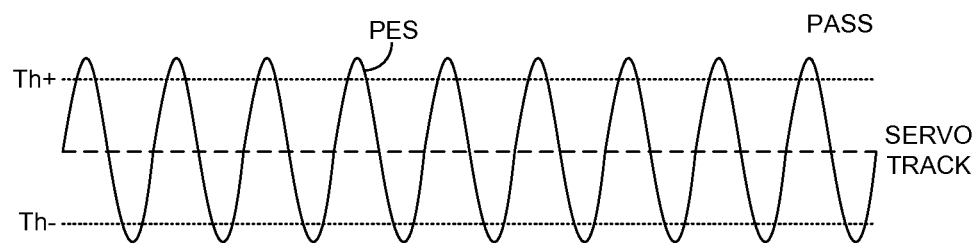
FIG. 5B shows an example embodiment of the present inventive concept wherein the PES indicates the microactuator is not defective.
Figure 5C:
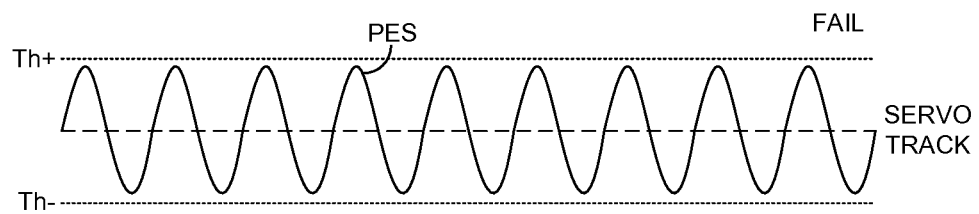
FIGS. 5C-5D show example embodiments of the present inventive concept wherein the PES indicates the microactuator is defective.
Figure 5D:
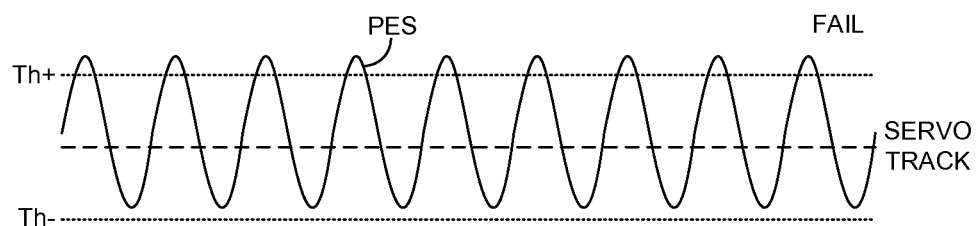

FIG. 5B illustrates a sinusoidal PES as a result of applying the sinusoidal control signal 66 to the microactuator $10_1$. In one example embodiment, the PES is compared to thresholds Th+ and Th− representing an offset from each side of the target servo track, wherein the microactuator $10_1$ is considered non-defective if the amplitude of the PES exceeds the thresholds. FIG. 5C shows an example of a defective microactuator $10_1$ wherein the PES falls below both thresholds (both sides of the servo track), and FIG. 5D shows an example of a defective microactuator $10_1$ wherein the PES falls below one of the thresholds (one side of the servo track).

Figure 5E:
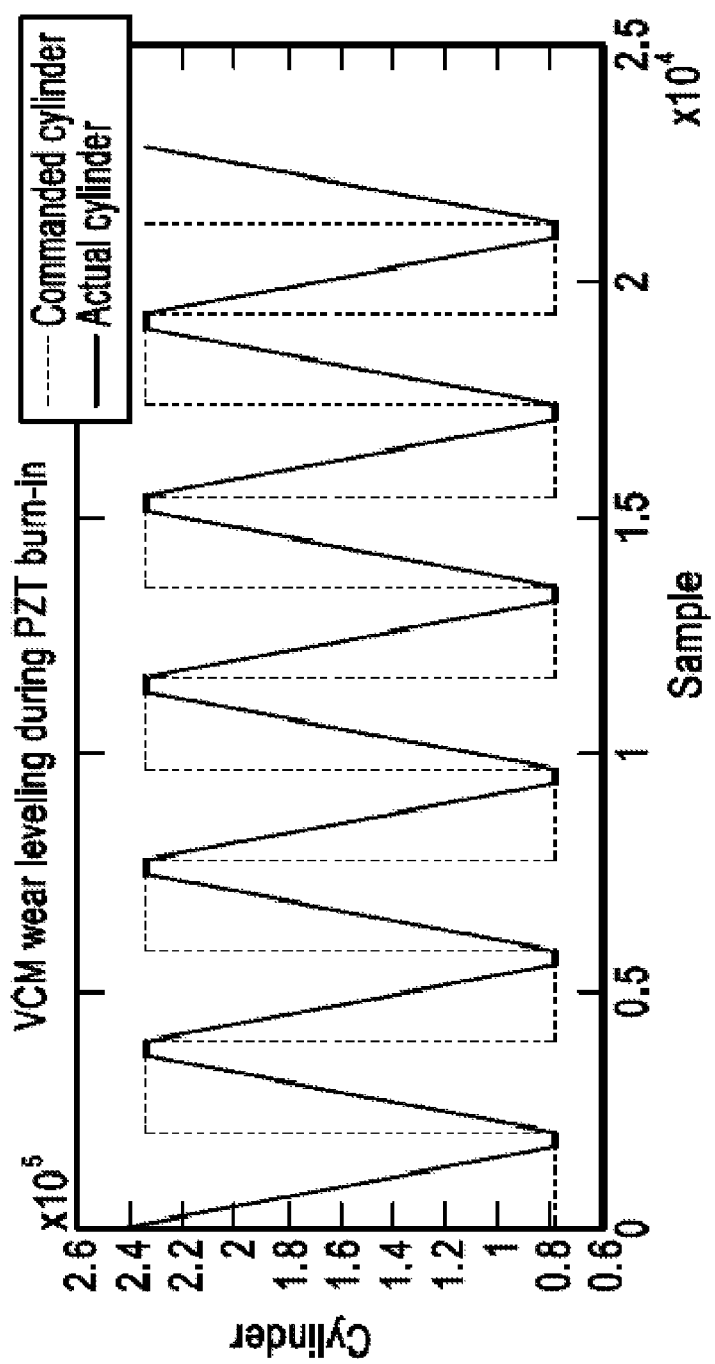
FIG. 5E shows a graph of VCM wear leveling during PZT burn-in according to an example embodiment of the present inventive concept.

FIG. 5E shows a graph of VCM wear leveling during PZT burn-in according to an example embodiment of the present inventive concept. In an example embodiment, the control circuitry executes servo fast interrupts (FIQ) and proportional-integral-derivative (PID) control to move the HSA. For example, the HSA can be controlled to move towards the inner diameter at a velocity determined by PID control, and can then change direction when within some distance of a target track. The dual stage actuator (DSA) exercise mechanism can involve a single frequency sine wave that uses output from the servo FIQ.

Figure 5F:
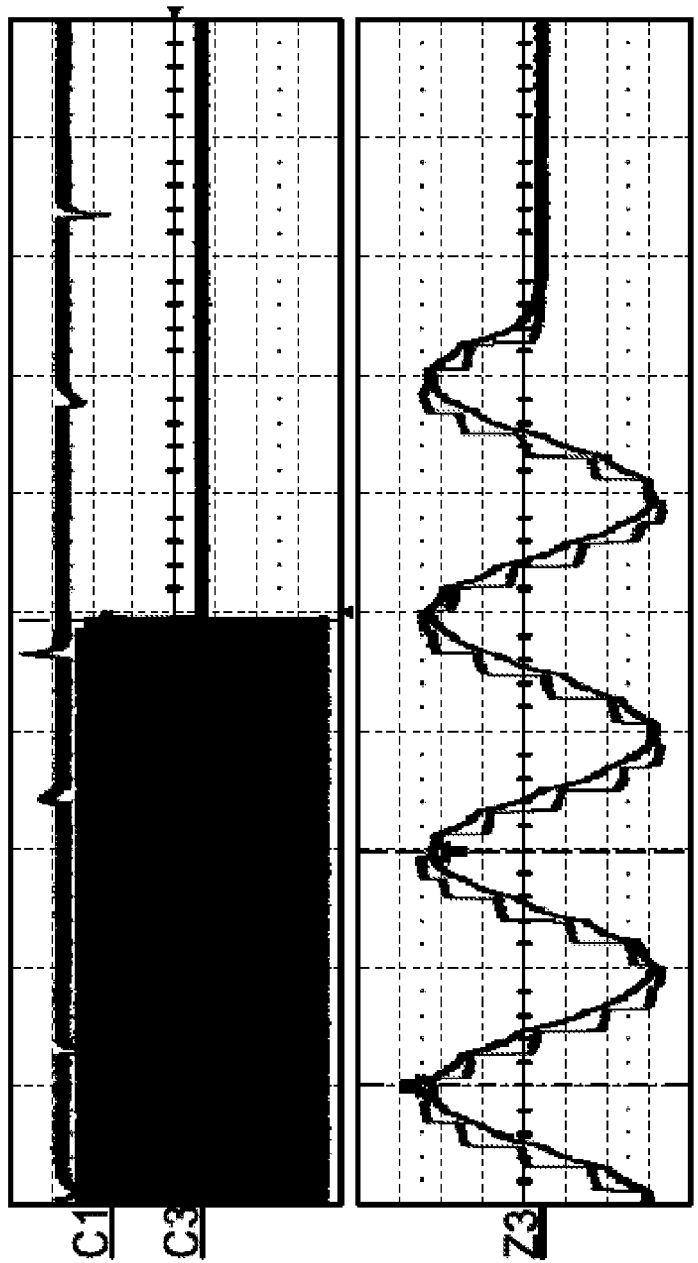
FIG. 5F illustrates a comparison of various waveforms according to an example embodiment of the present inventive concept.

FIG. 5F illustrates a comparison of various waveforms according to an example embodiment of the present inventive concept. In an example embodiment, the waveform can be made smoother and more continuous by employing a low pass filter (LPF), as shown in the upper graph. As indicated by the lower graph, the waveform before the application of the LPF is not smooth and is step-like, whereas the waveform after the application of the LPF is smoother and takes the form of a sine wave.

Figure 6A:
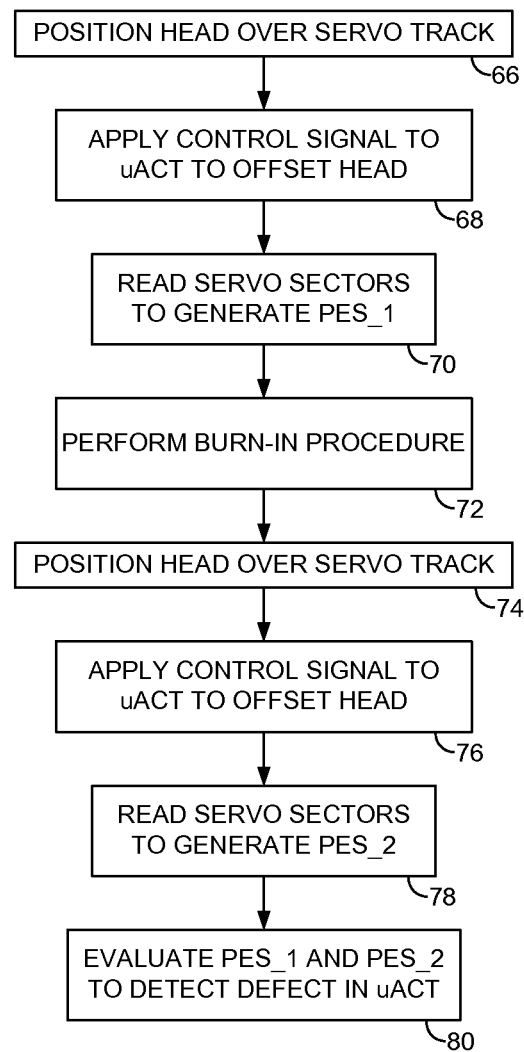
FIG. 6A is a flow diagram according to an example embodiment of the present inventive concept wherein a PES level is measured before exciting the microactuator, and after exciting the microactuator, wherein a difference between the PES measurements is used to evaluate the microactuator.
Figure 6B:
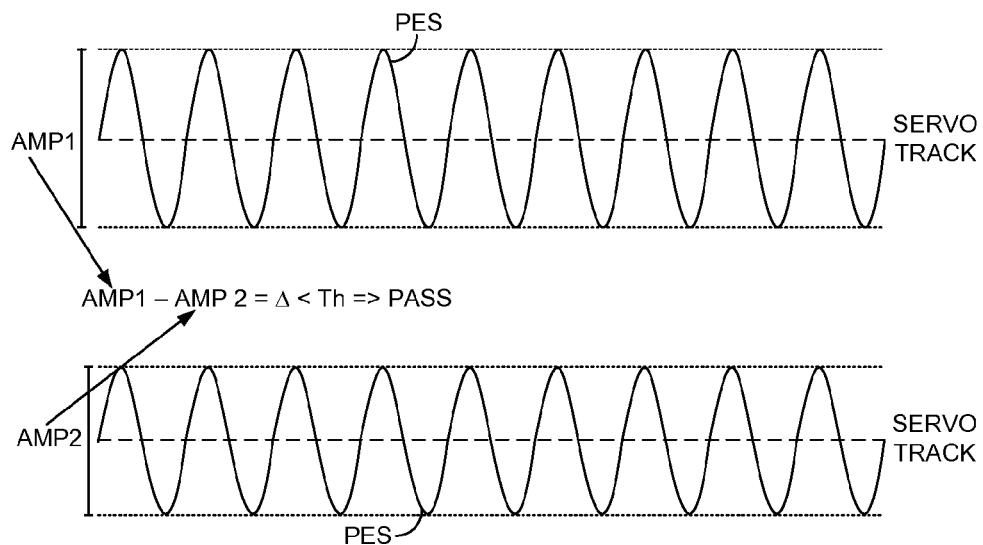
FIG. 6B shows an example embodiment of the present inventive concept wherein the difference between the PES measurements indicates the microactuator is not defective.
Figure 6C:
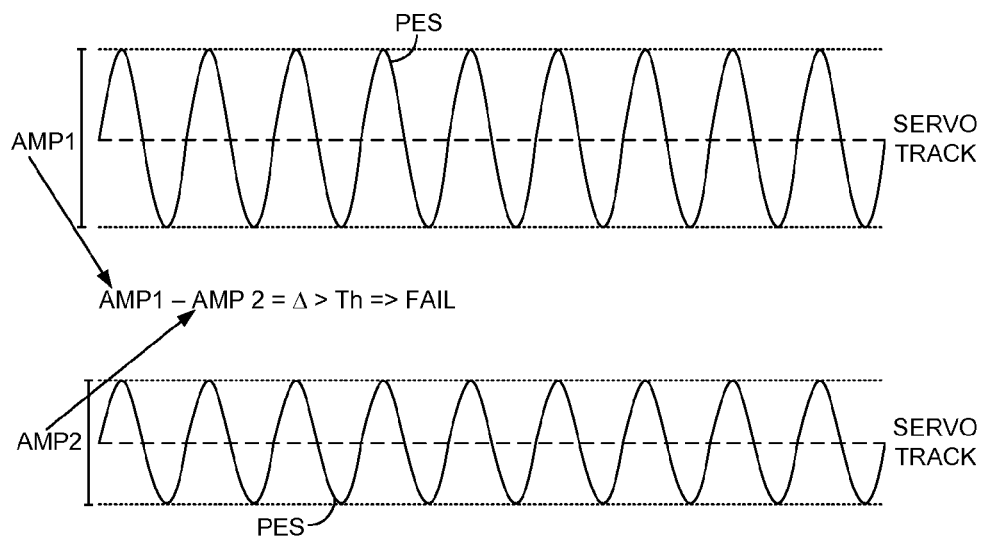
FIG. 6C shows an example embodiment of the present inventive concept wherein the difference between the PES measurements indicates the microactuator is defective.

FIG. 6A is a flow diagram according to an example embodiment of the present inventive concept for evaluating the microactuator $10_1$, wherein the head is positioned over a servo track (block 66) by reading the servo sectors, the head offset from the servo track by applying a control signal to the microactuator (block 68), and the servo sectors read to generate a first PES (block 70). The burn-in procedure is performed (block 72), wherein the microactuator can be excited at the test frequency to accentuate cracks. After exciting the microactuator, the head is repositioned over the servo track (block 74), the head offset from the servo track by applying a control signal to the microactuator (block 76), and the servo sectors read to generate a second PES (block 78). The microactuator is then evaluated by comparing the second PES to the first PES (block 80). This example embodiment is illustrated in FIGS. 6B and 6C wherein if the difference between the first and second PES is greater than a threshold, the microactuator is considered defective. Accordingly, in this example embodiment the microactuator is evaluated relative to a change in performance after exciting the microactuator as opposed to evaluating the absolute performance relative to an expected level.

Figure 6D:
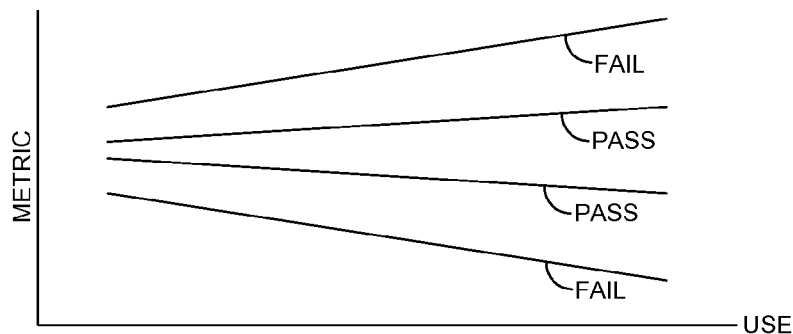
FIG. 6D shows an example embodiment of the present inventive concept wherein a slope of a metric is used to evaluate the microactuator.

Any suitable metric may be evaluated to determine whether the microactuator is defective. FIG. 6D illustrates an example embodiment of the present inventive concept wherein a rate of change of a metric (e.g., absolute measurement or difference measurement) is evaluated to determine whether the microactuator $10_1$ is defective. For example, the microactuator $10_1$ may be considered defective if the slope (positive or negative) of the metric exceeds a threshold. In this example embodiment, the microactuator $10_1$ may be excited multiple times and the metric measured after each excitation in order to measure the rate of change of the metric. The rate of change of the metric may be an indication of future failure even if the current value of the metric would otherwise pass the evaluation. In another example embodiment, prior to exciting the microactuator at the test frequency, a movement of the load beam is induced in order to induce a movement in the microactuator. A first induced voltage is detected in response to the induced movement, wherein the microactuator is excited at the test frequency. A movement of the load beam is again induced in order to induce a movement in the microactuator, and a second induced voltage is detected in response to the induced movement. A difference between the first and second induced voltages is evaluated in order to detect a defect in the microactuator. Other characteristics can include, for example, the frequency response of the microactuator. In one example embodiment, the absolute magnitude of the frequency response may be evaluated, and in another example embodiment, a difference between the magnitude before and after exciting the microactuator may be evaluated.

There may be potential head-disk interaction (HDI) concerns as the microactuator is excited at some test frequencies to accentuate cracks. Certain waveforms may potentially cause HDI events, which may result in head/media damage. Further, exciting the microactuator at a fixed track location for an extended time will increase the risk of HDI events, resulting failures such as lube moguling, lube depletion and slider air bearing surface (DLC layer) wear.

In another example embodiment of the present inventive concept, such HDI concerns are addressed by various configurations of the microactuator. Control circuitry is configured to select excitation waveforms and frequencies to reduce the HDI risks, as well as to configure the movement of the head stack assembly (HSA) to move between an inner diameter and an outer diameter of the media at a relatively low speed during excitation (e.g., less than 10 inches per second, about three inches per second or less, etc.), to avoid the situation where the heads fly on the media at the same location for an extended period of time.

As the head is moved back and forth between the inner diameter and the outer diameter, the speed and the path of the head can be adjusted based on the desired implementation, such that the head does not stay at a fixed location for a prolonged period of time. While the head is moving, the microactuator is excited at the test frequency to accentuate cracks or other defects. The movement and excitation can be repeated several times as well as during various conditions (e.g., in room temperature, at a hot temperature, etc.), depending on the desired implementation. The parameters of the microactuator can be examined before and after the excitation process for screening of failures.

Figure 7:
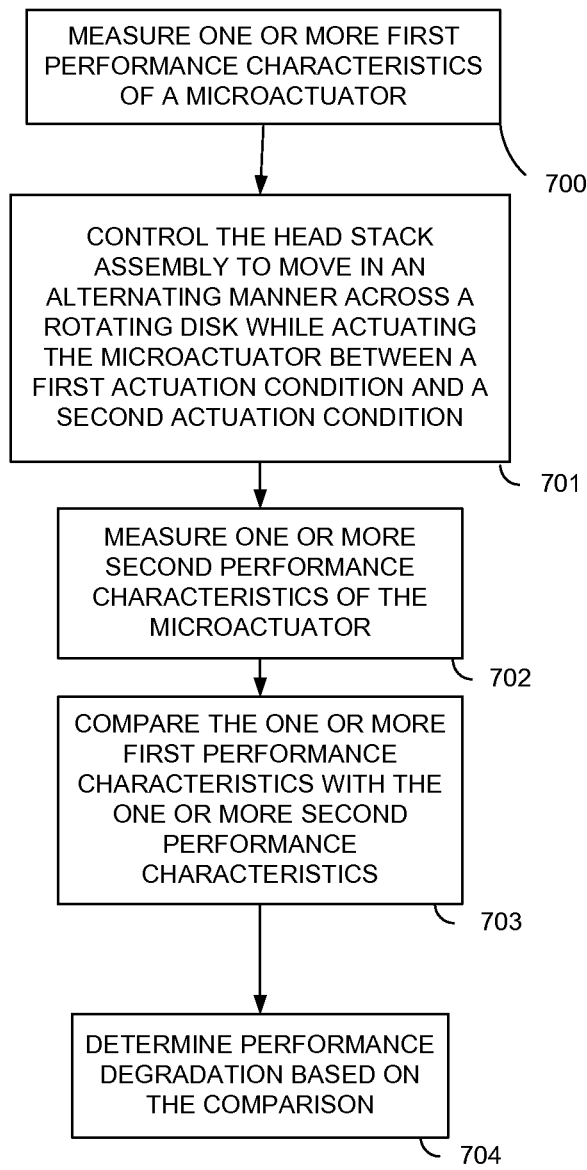
FIG. 7 shows a flow diagram for the control circuitry to determine performance degradation according to an example embodiment of the present inventive concept.

FIG. 7 is a flow diagram for control circuitry according to an example embodiment of the present inventive concept for testing a microactuator in a disk drive. The flow diagram is previously shown in FIG. 2 and a more detailed description of the flow diagram is provided below. At block 700, the control circuitry measures one or more first performance characteristics of the microactuator. At block 701, the control circuitry controls the head stack assembly (HSA) to move in an alternating manner (e.g., inner diameter to outer diameter and back, etc.) across a rotating disk, while actuating the microactuator between a first actuation condition and a second actuation condition (e.g., between positive/negative voltage at full level, at high frequency). The movement of the HSA may be performed in a slow motion. At block 702, the control circuitry measures one or more second performance characteristics of the microactuator. At block 703, the control circuitry compares the one or more first performance characteristics to the one or more second performance characteristics. At block 704, the control circuitry determines performance degradation from the comparison. The first and second performance characteristics can be any of the performance metrics as described above, for example, in FIGS. 6A-6D.

In one example embodiment, the velocity of the movement of the HSA can be configured through a timer mechanism, a velocity control mechanism, a servo control mechanism, or a combination of these mechanisms. In some embodiments, a particular mechanism may be applied to control the velocity when moving in one direction (e.g., using velocity control going from outer diameter to inner diameter) and another mechanism may be applied to control the velocity when moving in another direction (e.g., using timer when going from outer diameter to inner diameter). In one example embodiment, a default velocity can be used to move toward the inner diameter and a change of direction can be triggered when the servo control detects reaching a target track, or within a certain distance of a target track, on the disk. Each velocity control configuration may be coupled with a different DSA excitation waveform (e.g., single-frequency sine wave from a timer interrupt, single-frequency sine wave using some multiplier of the rate output of the servo control mechanism, etc.). The control circuitry can be configured to move the HSA in an alternating manner across the disk media based on the velocity and to detect a motion boundary based on at least one of the timer and an inner diameter crash stop. The velocity and timer can be configured depending on the layout of the disk drive and the desired implementation.

Figure 8:
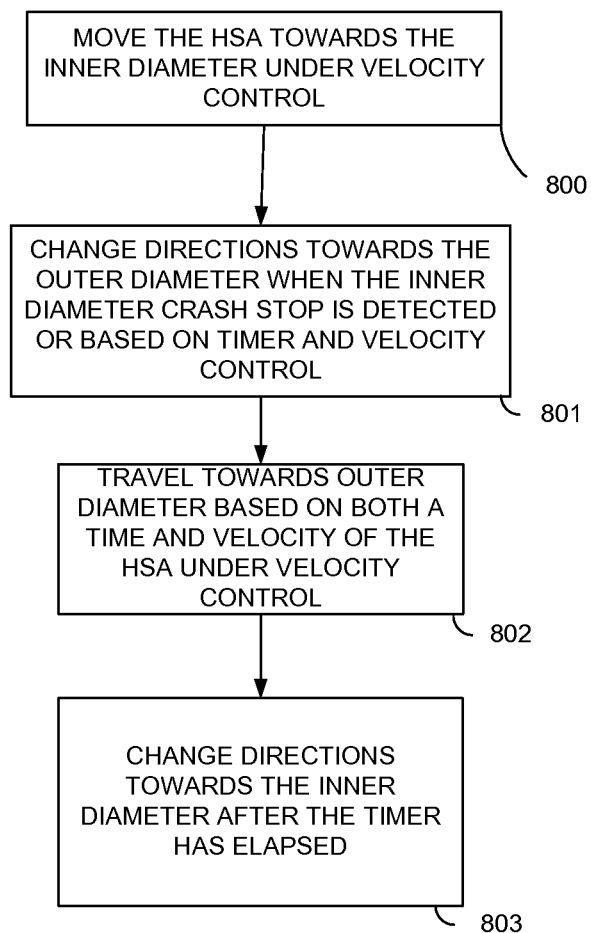
FIG. 8 shows a flow diagram for the control circuitry to alternate the HSA between the inner diameter and the outer diameter according to an example embodiment of the present inventive concept.

FIG. 8 shows a flow diagram for the control circuitry to alternate the HSA between the inner diameter and the outer diameter according to an example embodiment of the present inventive concept. At block 800, the HSA is moved towards the inner diameter under velocity control. At block 801, the HSA changes directions towards the outer diameter. The change in direction can be initiated when the inner diameter crash stop is detected, or can also be based on timer and velocity control. At block 802, the HSA changes directions to travel towards the outer diameter based both the time and velocity of the HSA under velocity control. At block 803, the HSA changes directions towards the inner diameter after the timer has elapsed.

Figure 9:
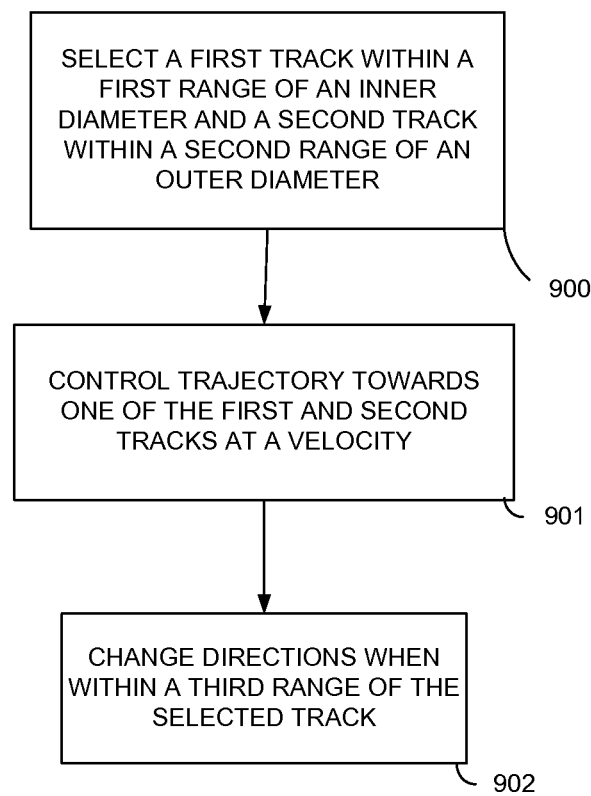
FIG. 9 shows a flow diagram for the control circuitry to alternate the HSA between the inner diameter and the outer diameter according to an example embodiment of the present inventive concept.

FIG. 9 shows a flow diagram for the control circuitry to alternate the HSA between the inner diameter and the outer diameter according to an example embodiment of the present inventive concept. At block 900, a first track is selected within a first range of an inner diameter and a second track is selected within a second range of an outer diameter. This can be implemented, for example, by controlling a trajectory of the VCM. At block 902, the HSA is controlled to change directions when the HSA is within a third range of the selected track. The control circuitry can utilize servo metadata to determine the position of the HSA. The first, second and third ranges can be utilized to compensate for variation in HSA movement, and/or to provide a safety margin such that the HSA does not fly off the disk media or crash against the inner diameter crash stop, depending on the desired implementation. The first and second tracks can also be selected based on the position of the HSA.

To further reduce the potential HDI risks, an additional waveform and/or frequency selection may be conducted for each head/media combination prior to the excitation. For example, a smooth sine wave with a certain frequency may be selected to avoid interaction to structural resonance in off-track and vertical directions. The waveform may be smoothed to avoid high-frequency harmonics which may excite the load beam motion in a vertical direction at a high-frequency range.

The selection of the waveform may be performed by recording the waveform from the control circuitry and utilizing the recorded waveform for exciting the microactuators while measuring motion of the load beam by using a vibrometer. The recorded waveform can be a predetermined waveform having a shape, a frequency, and an amplitude that is set based on the disk drive implementation. For example, one or more predetermined waveforms can be preset based on an impact to at least one component of the disk drive (e.g., the slider, the head, the disk media, the gimbal, etc.), and thereby selected based on such an impact and the desired implementation of the disk drive. Such impact can involve, for example, a frequency response on the components of the disk drive, and the waveform can be selected by selecting at least one of the shape, the frequency and the amplitude to apply to the desired implementation of the disk drive. The waveform may then be adjusted by the control circuitry to eliminate certain harmonics (e.g., higher) and/or undesired transients, based on the measurements from the vibrometer. The frequency selection may be repeated until the motion for the load beam is smoothed to a threshold from the measurements of the vibrometer, wherein the microactuators can be excited for an extended period of time to check for microactuator damage. The control circuitry can be configured to actuate the microactuator by generating a waveform for an actuation signal.

Figure 10:
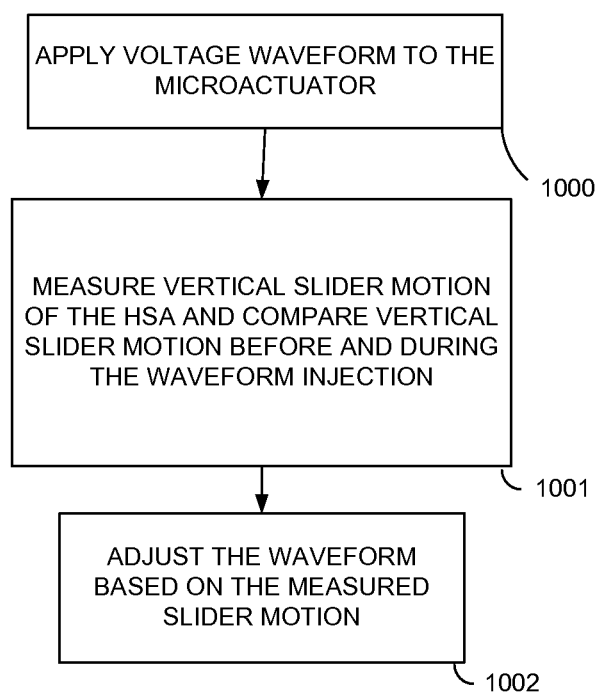
FIG. 10 shows a flow diagram for the control circuitry to adjust the waveform applied to the microactuator according to an example embodiment of the present inventive concept.

FIG. 10 shows a flow diagram for the control circuitry to adjust the waveform applied to the microactuator according to an example embodiment of the present inventive concept. At block 1000, the control circuitry applies a voltage waveform to the microactuator. The control circuitry can generate and apply the waveform based on a predetermined waveform having a shape, a frequency, and an amplitude. At block 1001, the control circuitry measures vertical slider motion of the HSA and compares the vertical slider motion before and during the waveform injection. At block 1002, the control circuitry adjusts the waveform based on the measured slider motion. The waveform can be generated based on the predetermined waveform by using a digital-analog conversion of the predetermined waveform as described in FIG. 11 below, and signal conditioning can be performed on the generated waveform to substantially match the generated waveform to the converted predetermined waveform. A low pass filter can be utilized to perform signal conditioning on the generated waveform.

Figure 11:
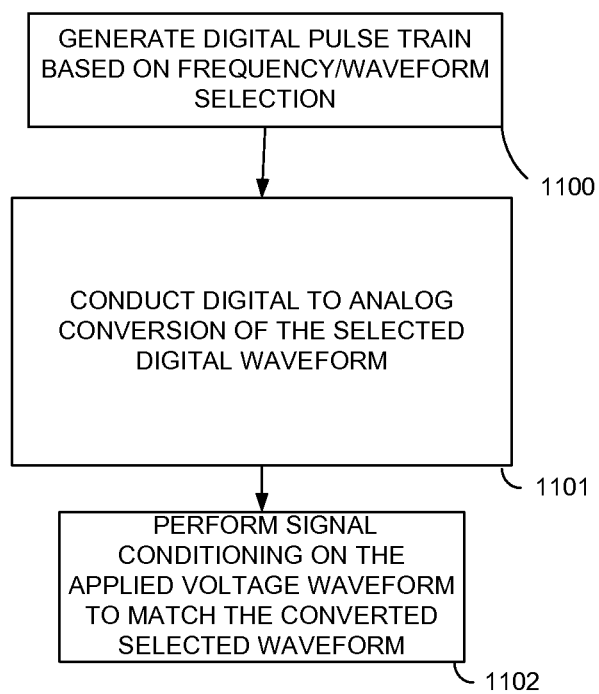
FIG. 11 shows a flow diagram for the control circuitry to perform signal conditioning to the applied waveform according to an example embodiment of the present inventive concept.

FIG. 11 shows a flow diagram for the control circuitry to perform signal conditioning to the applied waveform according to an example embodiment of the present inventive concept. At block 1100, a digital pulse train is generated based on frequency/waveform selection. At block 1101, digital to analog conversion of the selected digital waveform is conducted. At block 1102, signal conditioning is performed on the applied voltage waveform to match the converted selected waveform.

Any suitable control circuitry may be employed to implement the flow diagrams in the example embodiments of the present inventive concept, such as any suitable integrated circuit or circuits. For example, the control circuitry may be implemented within a read channel integrated circuit, or in a component separate from the read channel, such as a disk controller, or certain actions described above may be performed by a read channel and others by a disk controller. In one example embodiment, the read channel and disk controller are implemented as separate integrated circuits, and in an alternative example embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one example embodiment, the control circuitry comprises a microprocessor executing instructions, the instructions being operable to cause the microprocessor to perform the actions of the flow diagrams described herein. The instructions may be stored in any computer-readable medium. In one example embodiment, they may be stored on a non-volatile semiconductor memory external to the microprocessor, or integrated with the microprocessor in a SOC. In another example embodiment, the instructions are stored on the disk and read into a volatile semiconductor memory when the disk drive is powered on. In yet another example embodiment, the control circuitry comprises suitable logic circuitry, such as state machine circuitry.

What is claimed is:
1. A disk drive comprising:
a disk media;

a head stack assembly (HSA) comprising a head coupled to a distal end of an actuator arm;

a voice coil motor (VCM) and a microactuator configured to actuate the HSA over the disk media; and control circuitry configured to:
 control the VCM to move the HSA in an alternating manner across the disk media, while actuating the microactuator;
 measure one or more first performance characteristics of the microactuator while actuating the microactuator; and
 detect failure of the microactuator based on one or more first performance characteristics.

2. The disk drive of claim 1, wherein the control circuitry is further configured to measure one or more second performance characteristics of the microactuator before moving the HSA in an alternating manner across the disk media, and wherein the control circuitry is configured to detect failure by comparing the one or more first performance characteristics to the one or more second performance characteristics to determine performance degradation of the microactuator.

3. The disk drive of claim 1, wherein the control circuitry is configured to move the HSA in an alternating manner across the disk media by control of the VCM to alternate the HSA between an inner diameter and an outer diameter of the disk media.

4. The disk drive of claim 3, wherein the control circuitry is configured to move the HSA in an alternating manner across the disk media based on a velocity and to detect a motion boundary based on at least one of a timer and an inner diameter crash stop.

5. The disk drive of claim 1, wherein the control circuitry is configured to move the HSA in an alternating manner across the disk media by controlling a trajectory of the VCM.

6. The disk drive of claim 5, wherein the control circuitry is configured to control the trajectory of the VCM to move the HSA between a first track selected within a first range of an inner diameter of the disk media and a second track selected within a second range of an outer diameter of the disk media, wherein a position of the HSA is determined from servo metadata.

7. The disk drive of claim 1, wherein the control circuitry is configured to actuate the microactuator by generating a waveform for an actuation signal.

8. The disk drive of claim 7, wherein the control circuitry is further configured to generate the waveform based on a predetermined waveform having a shape, a frequency, and an amplitude.

9. The disk drive of claim 8, wherein the control circuitry is further configured to generate the waveform based on the predetermined waveform using a digital-analog conversion of the predetermined waveform, and performing signal conditioning on the generated waveform to substantially match the generated waveform to the converted predetermined waveform.

10. The disk drive of claim 9, wherein the control circuitry is further configured to utilize a low pass filter to perform signal conditioning on the generated waveform.

11. The disk drive of claim 9, wherein the control circuitry is configured to select the predetermined waveform based on an impact to at least one component of the disk drive.

12. The disk drive of claim 11, wherein the impact comprises a frequency response and wherein the control circuitry is configured to select the predetermined waveform by selecting at least one of the shape, the frequency and the amplitude.

13. A control circuitry configured to:
 control a voice coil motor (VCM) to move a head stack assembly (HSA) in an alternating manner across a disk media, while actuating a microactuator;
 measure one or more first performance characteristics of the microactuator while actuating the microactuator; and
 detect failure of the microactuator based on one or more first performance characteristics.

14. The control circuitry of claim 13, wherein the control circuitry is further configured to measure one or more second performance characteristics of the microactuator before moving the HSA in an alternating manner across the disk media, and wherein the control circuitry is configured to detect failure by comparing the one or more first performance characteristics to the one or more second performance characteristics to determine performance degradation of the microactuator.

15. The control circuitry of claim 13, wherein the control circuitry is further configured to move the HSA in an alternating manner across the disk media by control of the VCM to alternate the HSA between an inner diameter and an outer diameter of the disk media.

16. The control circuitry of claim 15, wherein the control circuitry is configured to move the HSA in an alternating manner across the disk media based on a velocity and to detect a motion boundary based on at least one of a timer and an inner diameter crash stop.

17. The control circuitry of claim 13, wherein the control circuitry is configured to move the HSA in an alternating manner across the disk media by controlling a trajectory of the VCM.

18. The control circuitry of claim 17, wherein the control circuitry is configured to control the trajectory of the VCM to move the HSA between a first track selected within a first range of an inner diameter of the disk media and a second track selected within a second range of an outer diameter of the disk media, wherein a position of the HSA is determined from servo metadata.

19. The control circuitry of claim 13, wherein the control circuitry is configured to actuate the microactuator by generating a waveform for an actuation signal.

20. The control circuitry of claim 19, wherein the control circuitry is further configured to generate the waveform based on a predetermined waveform having a shape, a frequency, and an amplitude.

21. The control circuitry of claim 20, wherein the control circuitry is further configured to generate the waveform based on the predetermined waveform using a digital-analog conversion of the predetermined waveform, and performing signal conditioning on the generated waveform to substantially match the generated waveform to the converted predetermined waveform.

22. The control circuitry of claim 21, wherein the control circuitry is further configured to utilize a low pass filter to perform signal conditioning on the generated waveform.

23. The control circuitry of claim 21, wherein the control circuitry is configured to select the predetermined waveform based on an impact to at least one component of a disk drive.

24. The control circuitry of claim 23, wherein the impact comprises a frequency response and wherein the control circuitry is configured to select the predetermined waveform by selecting at least one of the shape, the frequency and the amplitude.

* * * * *